(12) United States Patent
Shirakata et al.

(10) Patent No.: US 10,868,598 B2
(45) Date of Patent: Dec. 15, 2020

(54) WIRELESS COMMUNICATION APPARATUS AND DISPLAY METHOD FOR USE IN WIRELESS COMMUNICATION APPARATUS

(71) Applicant: Panasonic Intellectual Property Corporation of America, Torrance, CA (US)

(72) Inventors: Naganori Shirakata, Kanagawa (JP); Masayuki Shimizu, Tokyo (JP); Koji Takinami, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/015,088

(22) Filed: Jun. 21, 2018

(65) Prior Publication Data

US 2018/0302138 A1    Oct. 18, 2018

Related U.S. Application Data

(63) Continuation of application No. PCT/JP2016/004854, filed on Nov. 10, 2016.

(30) Foreign Application Priority Data

Feb. 12, 2016 (JP) .................................. 2016-024748

(51) Int. Cl.
*H04B 7/06* (2006.01)
*H04B 17/23* (2015.01)
(Continued)

(52) U.S. Cl.
CPC ............. *H04B 7/0617* (2013.01); *G01S 3/02* (2013.01); *G01S 3/74* (2013.01); *H04B 7/0417* (2013.01);
(Continued)

(58) Field of Classification Search
CPC .... H04B 7/0617; H04B 17/318; H04B 17/23; H04B 17/20; H04B 7/0417; H04B 7/0695;
(Continued)

(56) References Cited

U.S. PATENT DOCUMENTS

2004/0166811 A1    8/2004  Moon
2008/0259731 A1*  10/2008  Happonen .............. G10K 11/34
                                                              367/121
(Continued)

FOREIGN PATENT DOCUMENTS

JP    2002-016975 A    1/2002
JP    2007-110422 A    4/2007
(Continued)

OTHER PUBLICATIONS

The Extended European Search Report dated Jan. 4, 2019 for the related European Patent Application No. 16889755.1.
(Continued)

*Primary Examiner* — Pao Sinkantarakorn
*Assistant Examiner* — Kabir U Jahangir
(74) *Attorney, Agent, or Firm* — Seed IP Law Group LLP

(57) ABSTRACT

A wireless communication apparatus includes a first antenna circuit that forms a beam selected from among a plurality of first beams through a beamforming process performed for communication using a millimeter wave band and a monitor that displays a first pattern indicating a radiation direction of the selected beam.

6 Claims, 10 Drawing Sheets

(51) Int. Cl.
    *G01S 3/02*     (2006.01)
    *G01S 3/74*     (2006.01)
    *H04B 17/318*     (2015.01)
    *H04B 17/20*     (2015.01)
    *H04B 7/0417*     (2017.01)
    *H04W 16/28*     (2009.01)
    *H04W 72/04*     (2009.01)
    *H04B 7/10*     (2017.01)
    *H04B 7/0408*     (2017.01)
    *H04W 88/08*     (2009.01)

(52) U.S. Cl.
    CPC ........... *H04B 7/0695* (2013.01); *H04B 17/20* (2015.01); *H04B 17/23* (2015.01); *H04B 17/318* (2015.01); *H04W 16/28* (2013.01); *H04W 72/0446* (2013.01); *H04B 7/0408* (2013.01); *H04B 7/10* (2013.01); *H04W 72/046* (2013.01); *H04W 88/08* (2013.01)

(58) Field of Classification Search
    CPC ...... H04B 7/0408; H04B 7/10; H04B 7/0632; H04B 7/0626; G01S 3/74; G01S 3/02; H04W 16/28; H04W 72/0446; H04W 72/046; H04W 88/08
    See application file for complete search history.

(56) References Cited

U.S. PATENT DOCUMENTS

| | | |
|---|---|---|
| 2011/0228721 A1 | 9/2011 | Shinohara et al. |
| 2013/0050056 A1 | 2/2013 | Lee et al. |
| 2013/0189929 A1 | 7/2013 | Takahashi et al. |
| 2013/0230088 A1* | 9/2013 | Arad ................ G01R 29/08 375/228 |
| 2014/0064123 A1* | 3/2014 | Kim .................. H04W 24/08 370/252 |
| 2015/0181388 A1 | 6/2015 | Smith |
| 2015/0244478 A1* | 8/2015 | Shirakata ........... H04B 17/309 370/252 |

FOREIGN PATENT DOCUMENTS

| | | |
|---|---|---|
| JP | 2007-306234 A | 11/2007 |
| JP | 2008-048119 A | 2/2008 |
| JP | 2012-248935 A | 12/2012 |
| JP | 2014-529971 A | 11/2014 |
| WO | 2010/064716 A1 | 6/2010 |

OTHER PUBLICATIONS

International Search Report of PCT application No. PCT/JP2016/004854 dated Jan. 31, 2017.
IEEE Std 802.11ad(TM)-2012, IEEE Standard for Information Technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.
English Translation of Search Report of Taiwan dated Nov. 25, 2019 for the related Taiwan Patent Application No. 105137587.
"Using Wi-Fi WIN (Partial English Translation)", Aquos Shot SH010 Instruction Manual, Detailed Version, published as the first edition in Oct. 2010, p. 263-270.

* cited by examiner

WIRELESS COMMUNICATION APPARATUS AND DISPLAY METHOD FOR USE IN WIRELESS COMMUNICATION APPARATUS

BACKGROUND

1. Technical Field

The present disclosure relates to a wireless communication apparatus and a display method for use in the wireless communication apparatus.

2. Description of the Related Art

In recent years, in order to ensure a bandwidth of at least 1 GHz in response to the rapid increase in traffic demand, introduction of a small base station apparatus that performs communication using a millimeter wave band has been studied. For example, a communication system in which a plurality of small base station apparatuses are provided within a communication area of a base station apparatus that performs communication using a microwave band (also referred to as a heterogeneous network) is one of the alternatives of the plan.

Such a small base station apparatus uses a millimeter wave band. Accordingly, the propagation loss is larger than that in the microwave band and, therefore, it is difficult to extend the wireless reach range.

As one of techniques to reduce the propagation loss or increase the communication rate and the cell area, a base station apparatus and a terminal (also referred to as a "terminal station apparatus" or "STA") can perform directivity control (beamforming) by using a plurality of antenna elements (an antenna array). By performing the directivity control, a station apparatus (a base station apparatus or a terminal) can direct the radio wave to be transmitted to a communication partner apparatus. By employing the directivity control technique, the station apparatus (the base station apparatus or the terminal) enables the radio waves to reach a point farther than a point to which the radio waves reach in omnidirectional communication. Thus, the cell area that the station apparatus covers can be expanded. In addition, the station apparatus can improve SINR (Signal to Interference-plus-Noise power Ratio) by performing directivity control. Accordingly, by applying a modulation scheme and a coding rate with high frequency use efficiency, the station apparatus can perform communication at a high transmission rate (refer to, for example, IEEE 802.11 ad-2012 Standard for Information Technology—Telecommunications and Information Exchange between Systems—Local and Metropolitan networks—Specific requirements—Part 11: Wireless LAN Medium Access Control (MAC) and Physical Layer (PHY) Specifications Amendment 3: Enhancements for Very High Throughput in the 60 GHz Band).

In addition, a display method for letting the user know whether microwave band communication can be performed at high transmission rate by displaying the reception quality, such as a received electric field strength, on a terminal has been developed (refer to, for example, Japanese Patent No. 5641607).

SUMMARY

In a wireless network using a millimeter wave band, a terminal performs beamforming training in order to control the directivity for a base station apparatus to be connected. However, the rectilinearity of radio waves in the millimeter wave band is strong and the radio waves are weak against obstacles. Thus, when the radiating angle range of the radio waves is narrow and if at least one of the posture and the orientation of the terminal is changed, the communication coverage area changes. Accordingly, at least one of the posture and the orientation of the terminal affects the communication quality. However, the user does not know which direction the terminal is facing will improve the communication quality.

One non-limiting and exemplary embodiment provides a wireless communication apparatus that performs communication using a millimeter wave band and that enables a user to identify at least one of the posture and the orientation of the apparatus that improves the communication quality of the apparatus and a display method for use in the wireless communication apparatus.

In one general aspect, the techniques disclosed here feature a wireless communication apparatus includes a first antenna that forms a beam selected from among a plurality of first beams through a beamforming process performed for communication using a millimeter wave band and a monitor that displays a first pattern indicating a radiation direction of the selected beam.

According to the aspect of the present disclosure, a user is enabled to identify the posture/orientation of an apparatus that improves the communication quality of the apparatus.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure are described in detail below with reference to the accompanying drawings.
Underlying Knowledge Forming Basis of the Present Disclosure The underlying knowledge forming basis of the present disclosure is described first.

In general millimeter wave communication, a terminal successively switches the directivity so that the directivity is directed toward the base station apparatus and transmits a signal.

Figure 1:
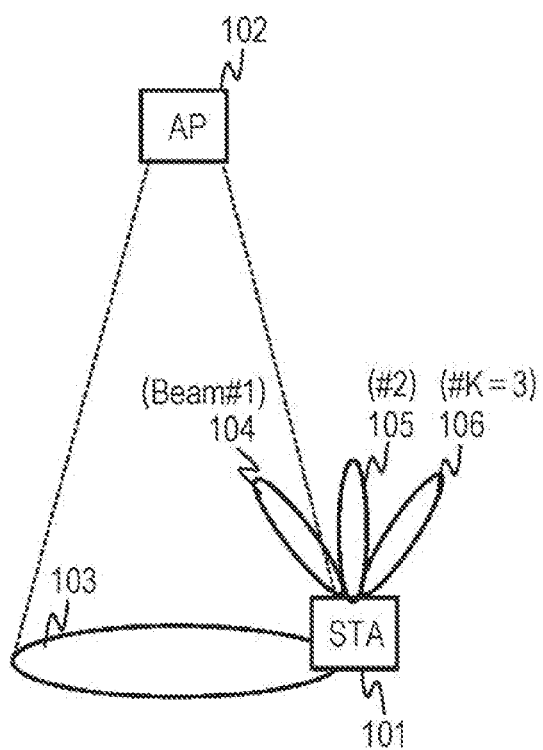
FIG. 1 illustrates an example of a millimeter wave communication system.

FIG. 1 illustrates an example of a millimeter wave communication system. FIG. 1 illustrates a millimeter-wave terminal 101 (hereinafter also referred to as a "terminal" or "STA"), a millimeter-wave base station apparatus 102 (hereinafter also referred to as an "AP (Access Point)"), and a communication coverage area 103 of the AP 102. For example, K directivity directions 104, 105, and 106 of radio waves (hereinafter also referred to as "beams") are formed by the antenna of the terminal 101 (K is an integer greater than or equal to 1, and K=3 in FIG. 1). The directivity directions are identified by numbers (hereinafter also referred to as "beam IDs") and are switched by the millimeter-wave terminal 101. As can be seen from FIG. 1, the directivity direction (the beam) 104 of radio waves is assigned a beam ID=1, the directivity direction (beam) 105 of the radio waves is assigned a beam ID=k, and directivity direction (beam) 106 of the radio waves is assigned a beam ID=K. Similarly, the AP 102 has a plurality of beams and can switch among the beams (not illustrated).

If the STA 101 is located within the range of the communication coverage area 103 of the AP 102, the STA 101 and the AP 102 can communicate data with each other. However, to improve the transmission quality, the STA 101 and the AP 102 need to select a combination of beams that provides the highest transmission quality therebetween.

Figure 2:
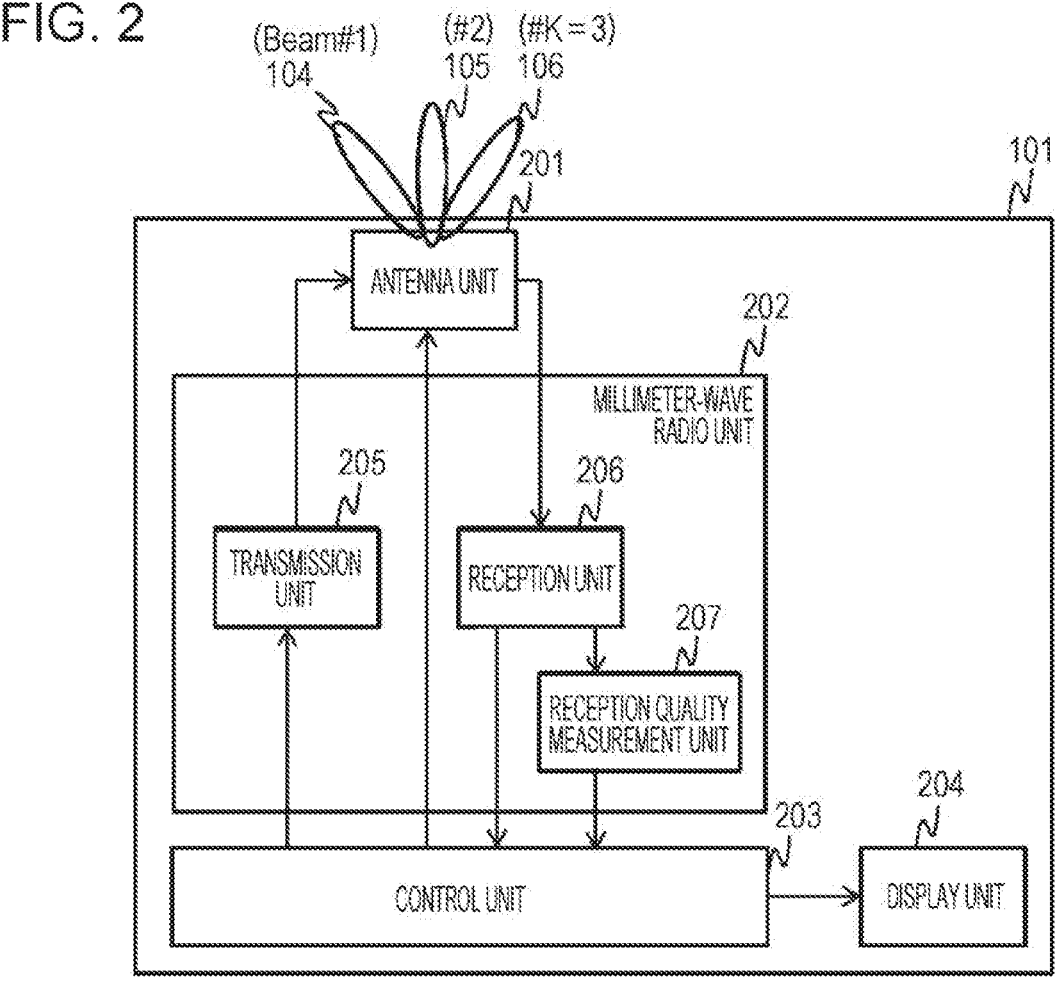
FIG. 2 illustrates an example of the configuration of a terminal.

FIG. 2 illustrates the configuration of the STA 101. The STA 101 includes an antenna unit (an antenna circuit) 201, a millimeter-wave radio unit (a millimeter-wave radio circuit) 202, a control unit (a control circuit) 203, a display unit (a monitor) 204, a transmission unit (a transmission circuit) 205, a reception unit (a reception circuit) 206, and a reception quality measurement unit (a reception quality measurement circuit) 207.

When transmitting a frame from the STA 101, the control unit 203 inputs transmission data to the transmission unit 205. The transmission unit 205 converts the input data into a signal format suitable for wireless communication, converts the data into a radio signal in the millimeter wave band, and outputs the radio signal to the antenna unit 201. In addition, the control unit 203 switches the antenna unit 201 to the transmission mode and selects a beam to be used for transmission. The antenna unit 201 switches the directivity to the selected beam and emits the radio signal input from the transmission unit 205.

When the STA 101 receives a frame, the control unit 203 switches the antenna unit 201 to the reception mode and selects the beam to be used for reception. The antenna unit 201 switches the directivity to the selected beam and outputs the received radio signal to the reception unit 206. After detecting a frame from the input radio signal, the reception unit 206 converts the frame into a signal in a frequency band suitable for signal processing, demodulates the signal in accordance with a predetermined signal format, and outputs the received data to the control unit 203. In addition, the reception quality measurement unit 207 measures the reception quality of the signal (for example, at least one of RSSI (Receive Signal Strength Indicator) indicating the reception strength, a signal-to-noise ratio SNR (Signal-to-Noise Ratio), a signal/interference noise ratio SINR (Signal-to-Interference-plus-Noise Ratio), and the error rate) and outputs the measurement result to the control unit 203 on the basis of the signal received from the reception unit 206. The control unit 203 outputs information to be displayed on the display unit 204 on the basis of the input received data and the information about the reception quality. The display unit 204 displays the input information for the user by using a device such as a display panel or an indicator.

Before performing data communication, the control unit 203 performs beamforming training to select a combination of beams that provides the best transmission quality with the AP 102.

Figure 3:
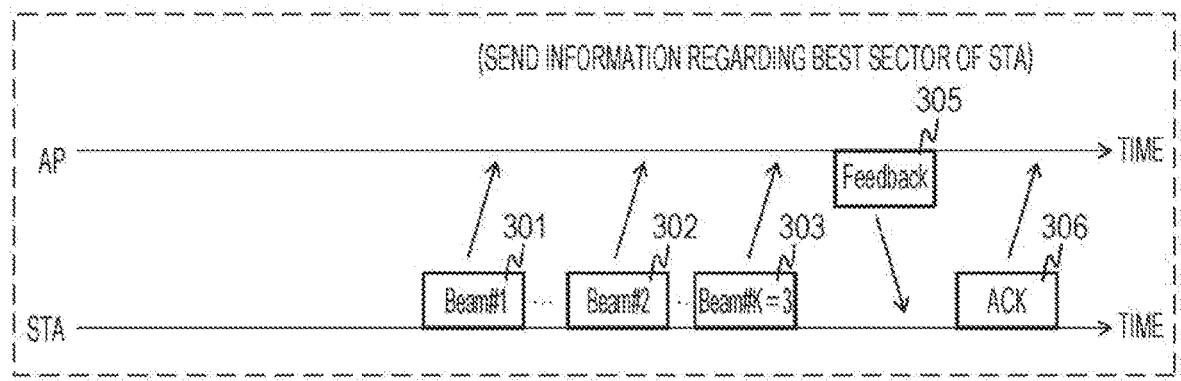
FIG. 3 is a timing diagram illustrating an example of beamforming training of the terminal.

FIG. 3 is a timing diagram illustrating an example of the beamforming training. FIG. 3 illustrates training frames 301, 302, and 303 transmitted by the STA 101, a feedback frame 305, and an ACK (Acknowledge) frame 306. Note that the training of the STA 101 is illustrated in FIG. 3. The AP 102 is trained in the same manner.

The STA 101 switches between beams first and transmits the training frames 301, 302, and 303. For example, the STA 101 transmits the training frame 301 by using the beam ID=1 (a beam 104), transmits the training frame 302 by using the beam ID=n (a beam 105), and transmits the training frame 303 by using the beam ID=N (a beam 106). Note that each of the training frames includes the information about the beam ID used for transmission and the information about the number of remaining frames indicating how many more frames the STA 101 will subsequently transmit.

Upon receiving the training frames 301, 302, and 303 successfully (receiving the training frames 301, 302, and 303 without error), the AP 102 stores the reception quality of each of the received training frames and the beam ID and the information about the number of the remaining frames included in the training frame. It may be difficult for the AP 102 to receive a training frame normally depending on the beam direction of the STA 101 and the orientation of the STA 101. However, the AP 102 can obtain the transmission period of the training frames from the STA 101 on the basis of the information about the number of remaining frames that the AP 102 was able to obtain from the normally received training frame.

After detecting the end of the transmission period of the training frames, the AP 102 selects, from among the training frames received by the AP 102 during the transmission period of the training frames (301 to 303) from the STA 101, one having the best reception quality. Thereafter, the AP 102 transmits, to the STA 101, the beam ID included in the selected training frame (hereinafter also referred to as the "best sector of the STA") by using the feedback frame 305.

The STA 101 receives the feedback frame 305. Thereafter, the STA 101 determines the beam ID that provides the best reception quality for transmission from the STA 101 to the AP 102 by using the informed beam ID indicating the best sector of the STA. Subsequently, the STA 101 uses the determined beam for the communication with the AP 102.

The STA 101 notifies the AP 102 of a reception response to the feedback frame 305 by using the ACK frame 306. In this manner, the beamforming training is completed.

Note that to change the directivity of a beam in a wide angular range, each of the STA 101 and the AP 102 uses a multi-element (e.g., 16 to 64 elements) antenna array as an antenna. However, in the case of using a multi-element antenna array, the circuit scale of a radio unit becomes large. Accordingly, it is difficult for a terminal for which compactness and low power consumption are required to have a multi-element antenna array therein. Therefore, the terminal has a narrow radio wave radiation angular range. Thus, if at least one of the posture and the orientation changes, the communicable range also changes.

From viewpoints of interest mentioned above, the present inventors have found that to improve the communication quality by increasing the communicable range of the terminal, it is effective to display a message prompting the user to point the antenna toward the base station apparatus.

First Embodiment

An example of the operation performed by the millimeter-wave terminal according to a first embodiment is described below with reference to FIG. 4.

A terminal (an STA) according to the present embodiment has a single antenna and forms a beam by the single antenna.

Figure 4:
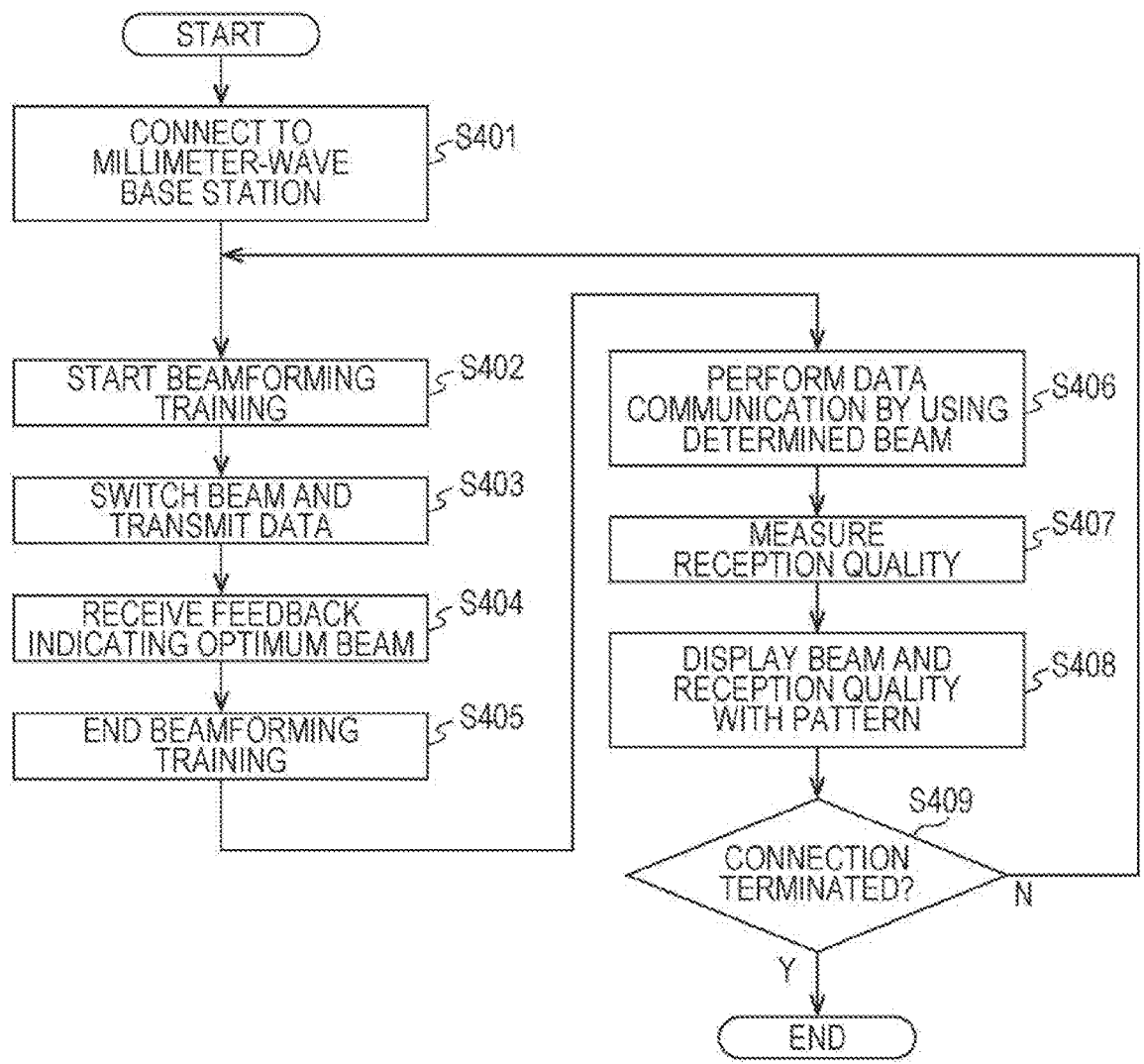
FIG. 4 is a flowchart illustrating the control performed by a control unit before a display operation is performed according to a first embodiment.

FIG. 4 is a flowchart illustrating the control performed by the control unit 203 of the STA 101 before a display operation is performed according to the present embodiment.

In step S401, the STA 101 starts establishing connection with the AP 102. For example, the STA 101 detects that it has entered the communication coverage area 103 by detecting a beacon frame periodically transmitted by the AP 102. Thereafter, the STA 101 sends a connection request to the AP 102.

After establishing connection with the AP 102, the STA 101 starts beamforming training (step S402). As described above, each time the STA 101 switches between beams, the STA 101 transmits a training frame (step S403), receives a feedback frame transmitted from the AP 102 (step S404), determines the beam used to communicate with the AP 102, and ends the beamforming training (step S405).

After the beamforming training ends, the data communication period starts. Thus, the STA 101 performs data communication with the AP 102 by using the determined beam (step S406).

At this time, the STA 101 measures the reception quality by using the reception frame during data communication (step S407) and displays the measured reception quality and the determined beam for the user (step S408). In step S409, the STA 101 determines whether to terminate the connection. If the STA 101 does not terminate the connection, the processing performed by the STA 101 returns to step S402. However, if the STA 101 terminates the connection, the STA 101 completes the processing.

Figure 5:
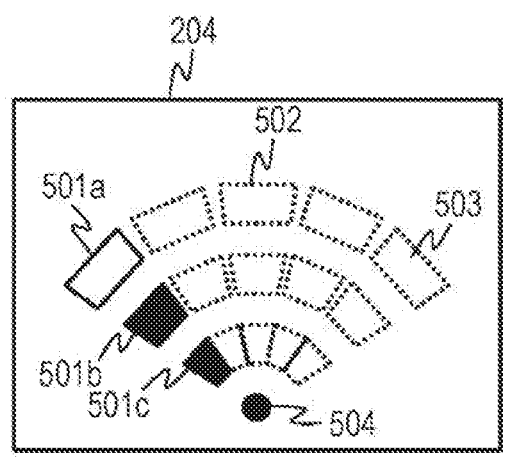
FIG. 5 illustrates a display example according to the first embodiment.

FIG. 5 illustrates a display example of a display pattern displayed on the display unit 204. According to the present embodiment, a pattern (a dotted line) indicating the radiation direction of a beam that can be formed by the antenna unit 201 and the direction of the beam actually formed by the antenna unit 201 (solid black) are displayed on the display unit 204. In the example illustrated in FIG. 5, the STA 101 displays the patterns of beams that can be formed by the antenna unit 201 by dividing the center angle of a circle sector by a predetermined angle (in the example illustrated in FIG. 5, the number of patterns of the radiation directions of the beams is 5, and each of the five patterns is formed by dividing the angle of a circular sector at a center 504 by the predetermined angle). The direction of the beam being formed by the antenna unit 201 is indicated by filling the area of one of the divided circular sectors with a color.

In addition, a circular sector which is a pattern indicating the radiation direction of one of the beams that can be formed is divided in the radial direction. As the reception quality increases, the number of the divided areas filled with a solid color increases in the radial direction from the center 504 to the outer periphery. In this manner, the reception quality is displayed.

The display example is described in more detail below. FIG. 5 illustrates a display pattern 501a, 501b and 501c corresponding to the beam 104 (FIG. 2), a display pattern 502 corresponding to the beam 105, and a display pattern 503 corresponding to the beam 106. A display pattern between the display pattern 501a, 501b and 501c and the display pattern 502 and a display pattern between the display pattern 502 and the display pattern 503 indicate a beam in the direction between the beam 104 and the beam 105 or a beam between the beams 105 and 106 (for example, beam ID=k−1 or beam ID=k+1). A circular section is a pattern indicating the radiation direction of a beam that can be formed by each of the antenna units. The displayed beam patterns indicated by the circular sectors can be changed in accordance with the number of beams.

In addition, the number of figures filled with a color in a pattern indicating a beam represents the reception quality level. For example, in the example illustrated in FIG. 5, the display pattern 501a, 501b and 501c indicates that the formed beam is the beam 104 and that the reception quality level is 2 (note that the best reception quality level is 3). A pattern drawn by a dotted line indicates an unselected beam (a beam currently not formed by the antenna unit 201). Note that in addition to the above-mentioned RSSI, SNR, SINR, or error rate, the reception quality may be information such as the communication rate, the throughput, or the modulation mode MCS (Modulation and Coding scheme) used. That is, when the reception quality level is 1 (the lowest level), the divided area 501c is filled with a color. When the reception quality level is 2, the divided areas 501c and 501b are filled with the color. When the reception quality level is 3 (the highest level), the divided areas 501a, 501b, and 501c are filled with the color. Note that during beamforming training, the display operation may be performed such that the center 504 is filled with a color and the divided areas are not filled with the color.

As described above, according to the present embodiment, by displaying the direction and the reception quality of the beam formed by the antenna unit 201 on the display unit 204, the user can recognize which one of the base station apparatuses located in the left and right directions the terminal held by the user is connected to. Thus, the user can sense in which direction the terminal should be oriented to improve the communication quality more. As a result, even when there is a shielding object or the like, the user can easily avoid the shielding object and perform stable communication.

Second Embodiment

According to the above-described first embodiment, the description has been given with reference to the display in the case where the terminal (the STA) has a single antenna, and the beam is formed by the single antenna. According to the present embodiment, a display scheme in the case where a terminal has a plurality of antennas with different beamforming directions is described.

More specifically, in the terminal, a plurality of antennas are mounted at different angles. Among the plurality of antennas, an antenna (an antenna unit) 1 is an antenna that radiates radio waves in the forward direction of the user when the user views the display unit and operates the terminal. An antenna (an antenna unit) 2 is an antenna that radiates radio waves in the backward direction of the user when the user views the display unit and operates the terminal.

Figure 6:
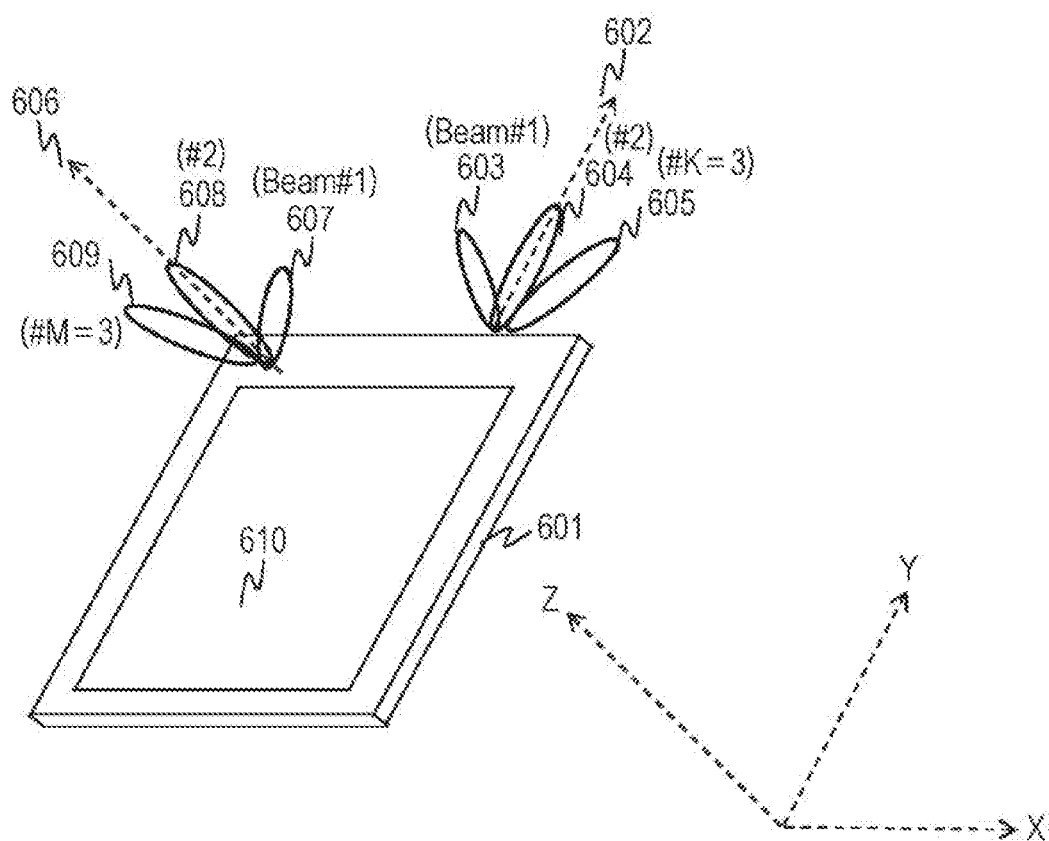
FIG. 6 illustrates an example of a beam emitted from a terminal having a plurality of antennas.

FIG. 6 illustrates an example of a terminal having a plurality of antennas. In FIG. 6, a terminal (a casing) 601, a radiation direction (a main direction) 602 of the antenna 1, beams 603, 604, and 605 that can be formed by the antenna 1, a radiation direction (a main direction) 606 of the antenna 2, beams 607, 608, and 609 that can be formed by the antenna 2, and a display unit 610 are illustrated. Note that in the example illustrated in FIG. 6, the number of beams K that the antenna 1 can form is 3, and the number of beams M that the antenna 2 can form is 3.

A tablet-based mobile terminal can be held by the user's hand and be used, or the tablet-based mobile terminal can be placed on a desk and be used. Accordingly, the antennas are arranged at positions suitable for the two usage situations. For example, in a situation where the terminal 601 is placed on a desk with the display unit 610 facing upward, it is desirable to use the antenna 2 whose main direction is the radiation direction 606.

A situation in which the user holds the terminal 601 by hand and uses the terminal 601 with the display unit 610 facing the user is described below. In a place where the AP is installed on the forward upper side of the user (for example, the ceiling), it is desirable that the terminal 601 use the antenna 1 whose main direction is the radiation direction 602. In contrast, in a place where the AP is installed immediate above the user or on the rearward upper side of the user, it is desirable that the terminal 601 use the antenna 2 whose main direction is the radiation direction 606.

If, as described above, the terminal includes a plurality of antennas with different directions in which beams can be formed, the convenience of the terminal is further improved by displaying the patterns indicating the radiation directions of the beams that can be formed by the antenna units and the direction of a beam being formed.

Figure 7:
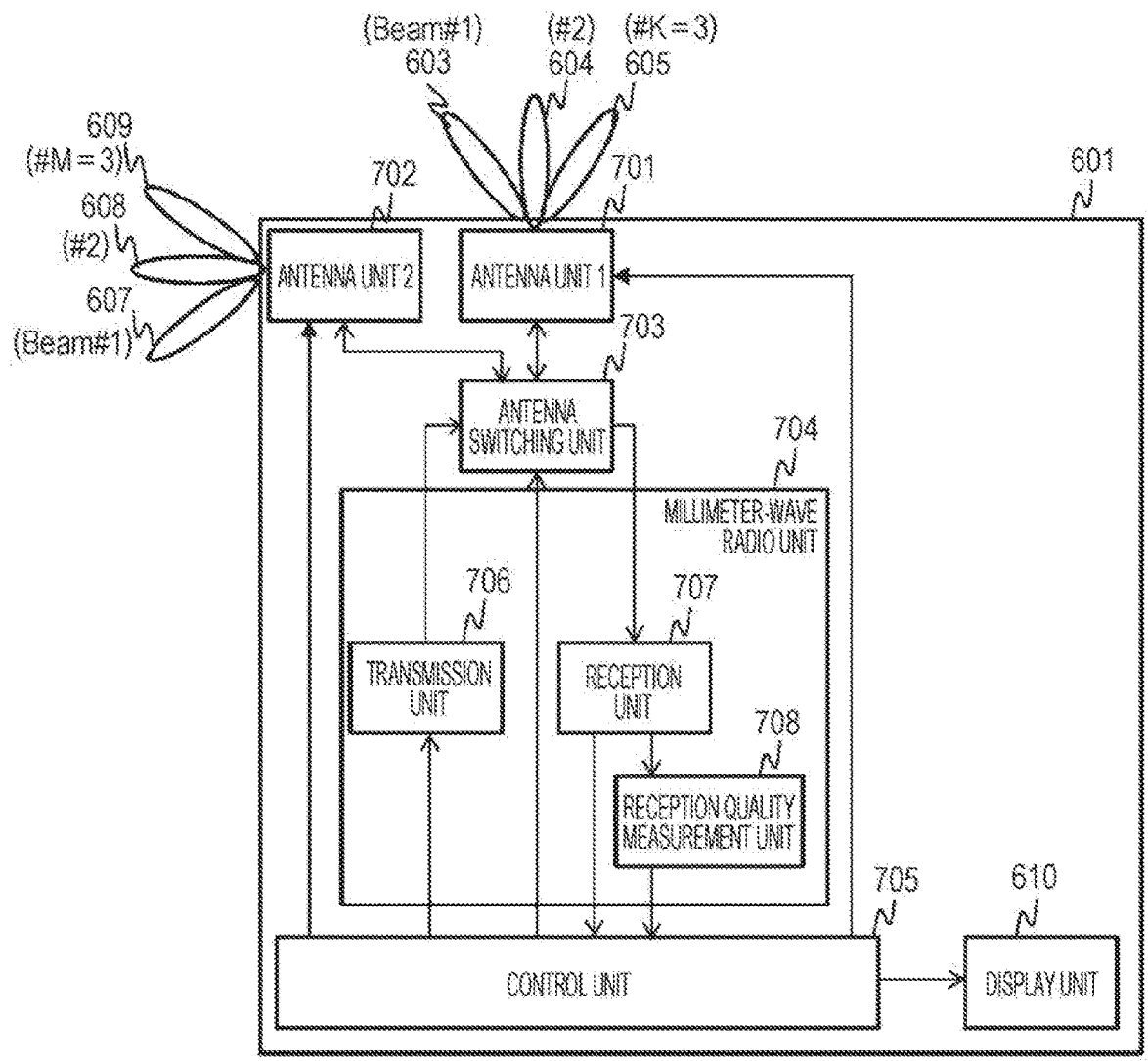
FIG. 7 is a block diagram of the configuration of a terminal according to a second embodiment.

FIG. 7 illustrates the configuration of the terminal 601 according to the present embodiment. The terminal 601 includes an antenna unit (an antenna circuit) 1 (701), an antenna unit (an antenna circuit) 2 (702), an antenna switching unit (an antenna switching circuit) 703, a millimeter-wave radio unit (a millimeter-wave radio circuit) 704, a control unit (a control circuit) 705, a transmission unit (a transmission circuit) 706, a reception unit (a reception circuit) 707, and a reception quality measurement unit (a reception quality measurement circuit) 708. The millimeter-wave radio unit 704 operates in the same manner as the millimeter-wave radio unit 202 illustrated in FIG. 2.

When transmitting a frame from the terminal 601, the control unit 705 inputs transmission data to the transmission unit 706. The transmission unit 706 converts the input communication data into a signal format suitable for wireless communication, converts the signal into a radio signal in a millimeter wave band, and outputs the radio signal to the antenna switching unit 703. The control unit 705 selects one of the antenna unit 1 (701) and the antenna unit 2 (702), controls the antenna switching unit 703 to switch the output path of the radio signal, and controls the selected antenna unit to switch to the transmission mode and select one of the beams used for transmission. The antenna switching unit 703 outputs the radio signal to the selected antenna unit. The selected antenna unit switches the directivity to the selected beam and radiates the radio signal input from the transmission unit 706 via the antenna switching unit 703.

When the terminal 601 receives a frame, the control unit 705 selects one of the antenna unit 1 and the antenna unit 2, controls the antenna switching unit 703 to switch the input path of the radio signal, and controls the selected antenna unit to enter the reception mode and select one of the beams used for reception. The antenna switching unit 703 outputs the radio signal input from the selected antenna unit to the reception unit 707. The selected antenna unit switches the directivity to the selected beam and outputs the received radio signal to the reception unit 707 via the antenna switching unit 703.

After detecting the frame from the input radio signal, the reception unit 707 converts the frame into a signal in a frequency band suitable for signal processing, demodulates the signal in accordance with a predetermined signal format, and outputs the received data to the control unit 705. In addition, the reception quality measurement unit 708 measures the reception quality of the signal on the basis of the signal from the reception unit 707 and outputs the measurement result to the control unit 705. The control unit 705 outputs information to be displayed on the display unit 610 on the basis of the input signal, reception quality, and information about the selected antenna unit. The display unit 610 displays the input information for the user by using a device such as a display panel or an indicator.

Before performing data communication, the control unit 705 performs beamforming training to select a combination of beams that provides the best transmission quality with the AP.

Figure 8:
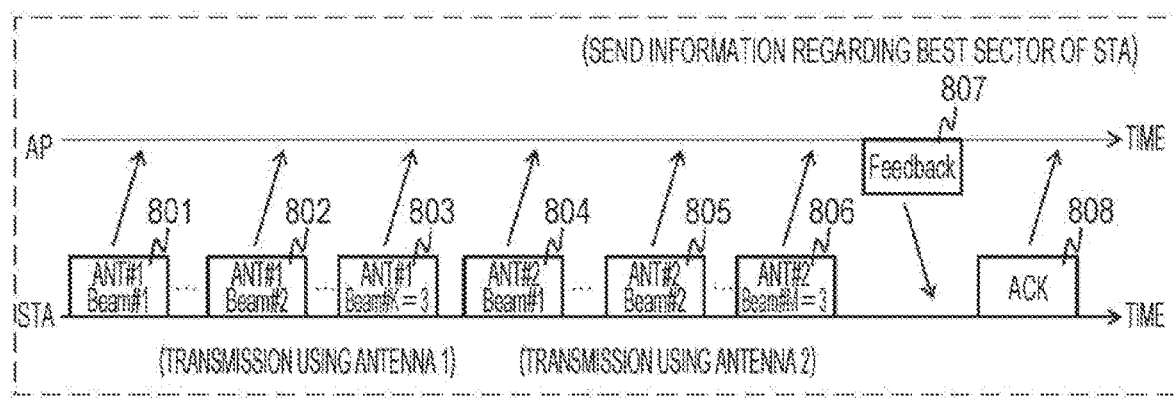
FIG. 8 is a timing diagram illustrating an example of beamforming training performed by the terminal according to the second embodiment.

FIG. 8 is a timing diagram illustrating an example of beamforming training performed between the STA 601 using a plurality of antennas and the AP 102. FIG. 8 illustrates training frames 801, 802, 803, 804, 805, and 806 transmitted by the STA 601, a feedback frame 807, and an ACK (Acknowledge) frame 808. Although the training of the STA 601 is illustrated in FIG. 8, the AP 102 is trained in the same manner.

The STA 601 switches the antenna to the antenna 1 (the antenna ID=1) first. Each time the beam of the antenna 1 is switched, the terminal 601 transmits one of the training frames 801, 802, and 803. For example, the STA 601 transmits the training frame 801 with the antenna ID=1 and the beam ID=1 (the beam 603), transmits the training frame 802 with the antenna ID=1 and the beam ID=n (the beam 604), and transmits the training frame 803 with the antenna ID=1 and the beam ID=N (the beam 605).

Subsequently, the STA 601 switches the antenna to the antenna 2 (the antenna ID=2). Each time the terminal 601 switches the beam of the antenna 2, the terminal 601 transmits one of the training frames 804, 805, and 806. For example, the STA 601 transmits the training frame 804 with the antenna ID=2 and the beam ID=1 (the beam 607), transmits the training frame 805 with the antenna ID=2 and the beam ID=m (the beam 608), and transmits the training frame 806 with the antenna ID=2 and the beam ID=M (the beam 609).

Note that each of the training frames includes the information regarding the antenna ID and beam ID used for transmission and the information regarding the number of remaining frames indicating how many more frames are to be transmitted subsequent to the current training frame.

If the AP 102 normally receives the training frames 801, 802, 803, 804, 805, and 806, the AP 102 stores the reception quality of each of the received training frames and the information regarding the antenna ID, the beam ID, and the number of remaining frames included in the training frame. It may be difficult for the AP 102 to normally receive a training frame depending on the antenna direction of the STA 601, the beam direction, and the orientation of the STA 601 itself. However, the AP 102 can obtain the transmission period of the training frames from the STA 601 on the basis of the information regarding the number of remaining frames that the AP 102 was able to obtain from the normally received training frame.

After detecting the end of the training frame transmission period, the AP 102 selects, from among the training frames received by the AP 102 during the transmission period of the training frames (801 to 806) from the STA 601, one having the best reception quality. Thereafter, the AP 102 transmits, to the STA 601, the antenna ID and the beam ID included in the selected training frame (hereinafter also referred to as the "best sector of the STA") by using the feedback frame 807.

The STA 601 receives the feedback frame 807. Thereafter, the STA 601 determines the antenna ID and the beam ID that provide the best reception quality for transmission from the STA 601 to the AP 102 by using the informed antenna ID and the beam ID indicating the best sector of the STA. Subsequently, the STA 601 uses the determined antenna and beam for the communication with the AP 102.

The STA 601 sends, to the AP 102, the reception response to the feedback frame 807 by using the ACK frame 808. In this manner, the beamforming training is completed.

Figure 9:
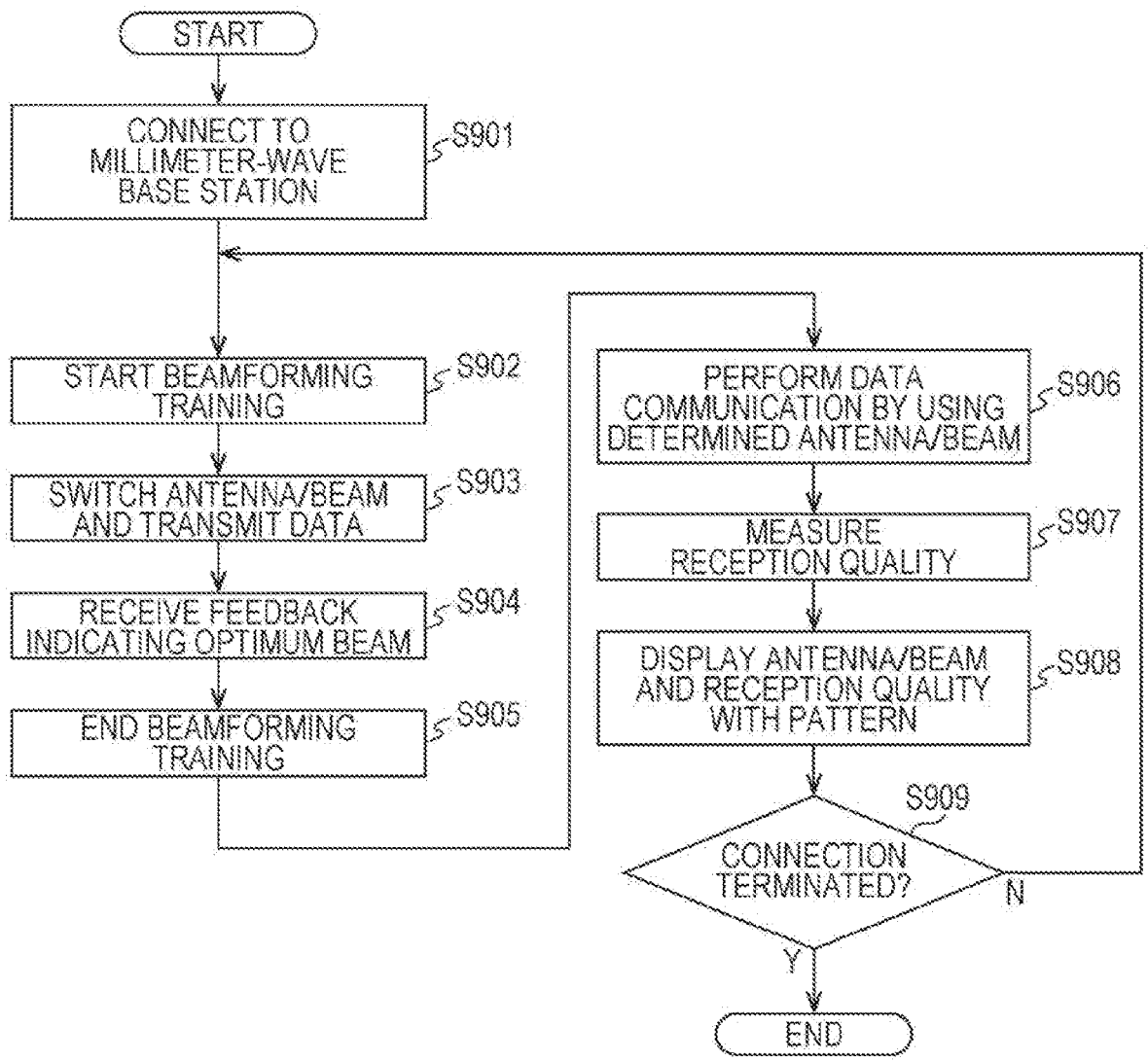
FIG. 9 is a flowchart illustrating the control performed by a control unit before a display operation is performed according to the second embodiment.

FIG. 9 is a flowchart illustrating the control performed by the control unit 705 of the STA 601 before a display operation according to the present embodiment is performed. In FIG. 9, the letter "S" represents "step".

In step S901, the STA 601 starts establishing connection with the AP 102. For example, the STA 601 detects that it has entered the communication coverage area by detecting a beacon frame periodically transmitted from the AP 102 and sends a connection request to the AP 102.

After establishing connection with the AP 102, the STA 601 starts beamforming training (step S902). As described above, each time the antenna and the beam are switched, the STA 601 transmits a training frame (step S903), receives a feedback frame transmitted from the AP 102 (step S904), and determines the antenna and the beam used to communicate with the AP 102. Thereafter, beamforming training is completed (step S905).

After the beamforming training ends, the data communication period starts, and the STA 601 performs data communication with the AP 102 by using the determined antenna and beam (step S906).

At this time, the STA 601 measures the reception quality by using the received frame during data communication (step S907) and displays the measured reception quality and the determined beam to the user (step S908). In step S909, the STA 601 determines whether to terminate the connection. If the connection is not to be terminated, the processing performed by the STA 601 returns to step S902. However, if the connection is to be terminated, the processing ends.

Figure 10A:
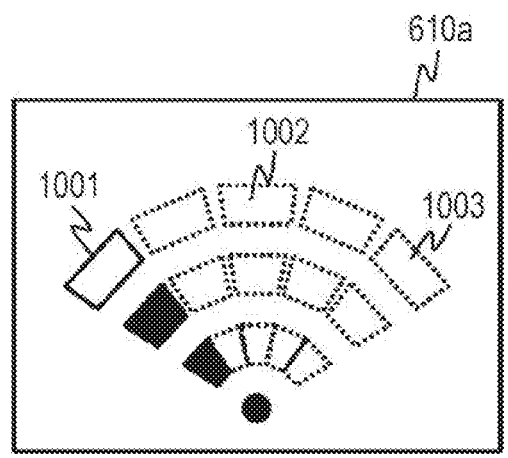
FIG. 10A illustrates a display image related to antenna unit 1 according to the second embodiment.
Figure 10B:
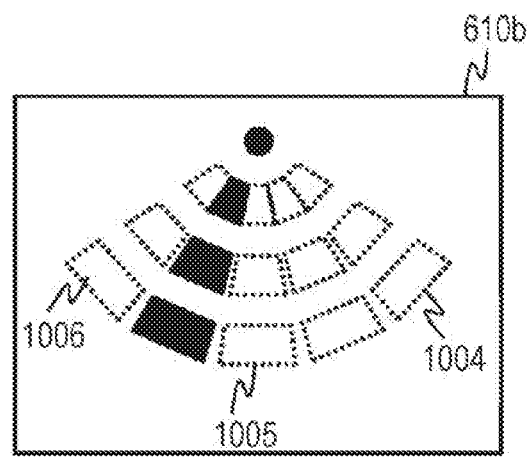
FIG. 10B illustrates a display image related to antenna unit 2 according to the second embodiment.

FIG. 10A and FIG. 10B illustrate display examples of beams displayed on the display unit 610. In the display according to the present embodiment, in addition to the display characteristics according to the above-described first embodiment, a pattern (a dotted line) indicating the radiation direction of the beam that can be formed by each of the antenna units and the direction of the beam (solid black) actually formed by the antenna unit are displayed.

The display examples are described in more detail below. The display image 610a in FIG. 10A indicates a display pattern 1001 corresponding to the beam 603 (FIG. 7), a display pattern 1002 corresponding to the beam 604, and a display pattern 1003 corresponding to the beam 605. A display pattern between the display pattern 1001 and the display pattern 1002 and a display pattern between the display pattern 1002 and the display pattern 1003 are a beam between the beam 603 and the beam 604 (for example, beam ID=k−1) and a beam between the beam 604 and the beam 605 (for example, a beam ID=k+1), respectively. A circular section is a pattern indicating the radiation direction of a beam that can be formed by each of the antenna units. The displayed beam patterns indicated by the circular sectors can be changed in accordance with the number of beams.

To indicate that the antenna 1 (the main radiation direction 602) is being used and to let the user to know that the direction in which the base station apparatus is located is the frontward direction of the user, the display patterns 1001, 1002, and 1003 can be patterns of the circular sectors pointing upward (facing the direction away from the user).

In addition, a display image 610b in FIG. 10B represents a display pattern 1004 corresponding to the beam 607 (FIG. 7), a display pattern 1005 corresponding to the beam 608, and a display pattern 1006 corresponding to the beam 609. A display pattern between the display pattern 1004 and the display pattern 1005 and a display pattern between the display pattern 1005 and the display pattern 1006 are beams in the direction between the beam 607 and the beam 608 and between the beam 608 and the beam 609 (for example, beam ID=m−1 and beam ID=m+1). A circular section is a pattern indicating the radiation direction of a beam that can be formed by each of the antenna units. The displayed beam patterns indicated by the circular sector can be changed in accordance with the number of beams.

To indicate that the antenna 2 (the main radiation direction 606) is being used and let the user to know that the direction in which the base station apparatus is located is the rearward direction of the user, the display patterns 1004, 1005, and 1006 can be patterns of the circular sectors pointing downward (facing a direction toward the user).

In addition, the number of blocks filled with a color in a pattern indicating a beam represents the reception quality level. For example, in the example illustrated in FIG. 10A, the display pattern 1001 displayed on the display unit 610 indicates that the formed beam is the beam 603 and that the reception quality level is 2. A pattern represented by dotted lines indicates an unselected beam (a beam currently not formed by the antenna unit 1). Note that in addition to the above-mentioned RSSI, SNR, SINR, or error rate, the reception quality may be information such as the communication rate, the throughput, or the modulation mode MCS (Modulation and Coding scheme) used.

As described above, according to the present embodiment, by displaying the selected antenna, the direction and the reception quality of the beam formed by the selected antenna on the display unit 610, the user can easily get to know which one of the base station apparatuses located in the frontward, rearward, rightward, and leftward directions of the user is the one connected to the terminal that the user holds (that is, in addition to the base station apparatuses located in the leftward direction and the rightward direction, the base station apparatuses located in the frontward direction and the rearward direction are checked). Thus, the user can sense in which direction the terminal should be pointed to improve the communication quality more. As a result, even when there is a shielding object or the like, the user can easily avoid the shielding object and perform stable communication.

According to the present embodiment, the case where two antennas are used has been described. However, the present embodiment is applicable to the case where three or more antennas are used. That is, it is only required to display the pattern indicating the radiation direction of a beam that can be formed by each of the antenna units and the direction of the formed beam.

Third Embodiment

According to the present embodiment, a display scheme is described in the case where communication using the microwave band can be performed in addition to communication using the millimeter wave band described above in the first and second embodiments.

Figure 11:
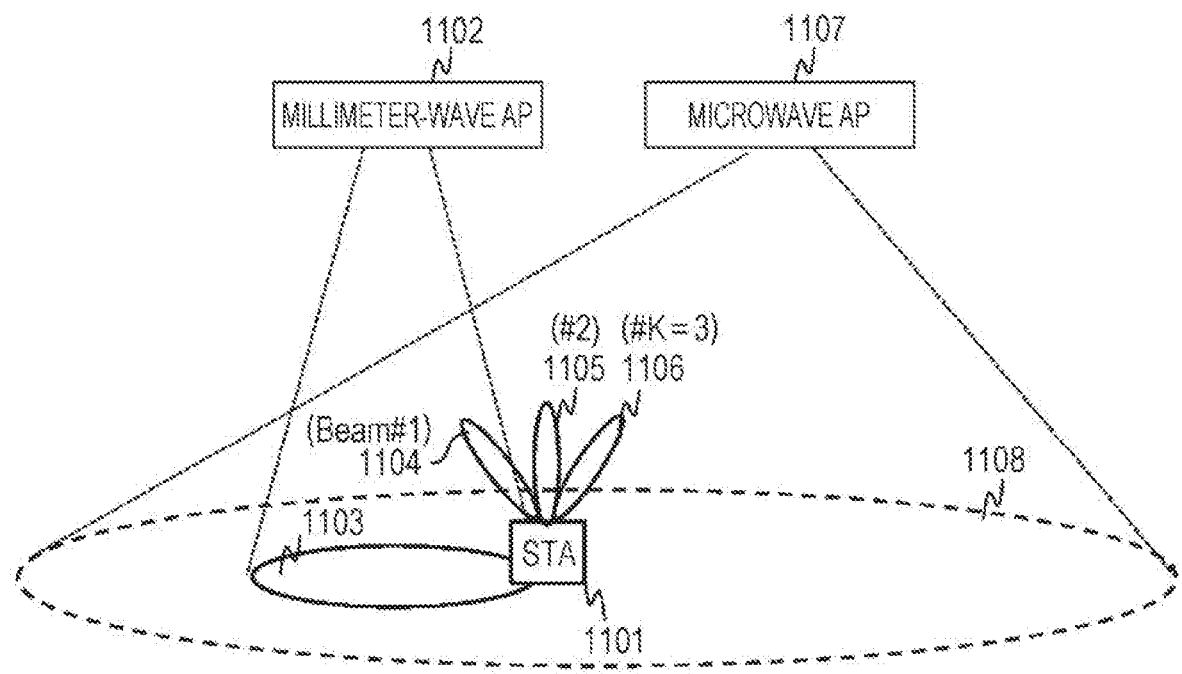
FIG. 11 illustrates a heterogeneous network system formed by combining microwave communication with millimeter wave communication.

FIG. 11 illustrates an example of a heterogeneous network system formed by combining microwave communication with millimeter wave communication. In FIG. 11, a terminal 1101 is a multiband terminal that can perform communication by using both millimeter waves and microwaves. A millimeter-wave base station apparatus 1102, a communication coverage area 1103 of the millimeter-wave base station apparatus 1102, beams 1104, 1105, and 1106 formed by millimeter wave antennas of the multiband terminal 1101, a microwave base station apparatus 1107, and a communication coverage area 1108 of the microwave base station apparatus 1107 are illustrated in FIG. 11. The microwave base station apparatus 1107 is a wireless LAN that uses the 2.4-GHz band or the 5-GHz band, for example.

After moved into the communication coverage area 1108, the multiband terminal 1101 connects to the microwave base station apparatus 1107. After moved into the communication coverage area 1103, the multiband terminal 1101 connects to the millimeter-wave base station apparatus 1102 and performs data communication.

Figure 12:
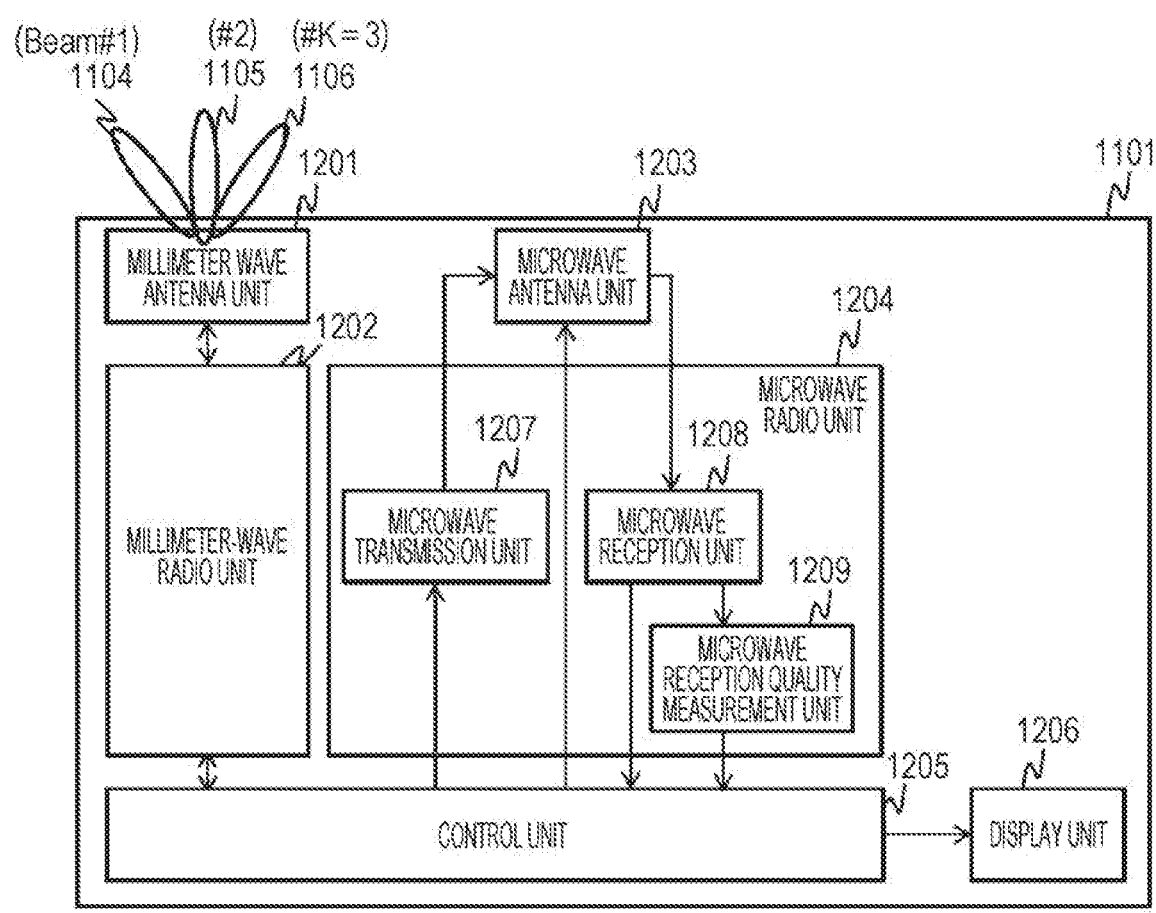
FIG. 12 illustrates an example of the configuration of a terminal according to a third embodiment.

FIG. 12 illustrates the configuration of the multiband terminal 1101. The multiband terminal 1101 includes a millimeter wave antenna unit (a millimeter wave antenna circuit) 1201, a millimeter-wave radio unit (a millimeter-wave radio circuit) 1202, a microwave antenna unit (a microwave antenna circuit) 1203, a microwave radio unit (a microwave radio circuit) 1204, a control unit (a control circuit) 1205, and a display unit (a monitor) 1206. The microwave radio unit 1204 includes a microwave transmission unit (a microwave transmission circuit) 1207, a microwave reception unit (a microwave reception circuit) 1208, and a microwave reception quality measurement unit (a microwave reception quality measurement circuit) 1209.

The millimeter wave antenna unit 1201 is similar to the antenna unit 201 (FIG. 2), and the millimeter-wave radio unit 1202 is similar to the millimeter-wave radio unit 202 (FIG. 2). In addition, the operation in which the control unit 1205 connects to the millimeter-wave base station apparatus 1102 and performs data communication is the same as described above.

To connect to the microwave base station apparatus 1107 and perform data communication, the multiband terminal 1101 operates as follows.

When transmitting a microwave frame from the multiband terminal 1101, the control unit 1205 inputs transmission data to the microwave transmission unit 1207. The microwave transmission unit 1207 converts the input communication data into a signal format suitable for microwave wireless communication, converts the communication data into a radio signal in the microwave band, and outputs the radio signal to the microwave antenna unit 1203. The control unit 1205 switches the microwave antenna unit 1203 to the transmission mode. Note that the microwave antenna unit 1203 radiates the radio signal input from the microwave transmission unit 1207. At this time, since in general, the rectilinearity of microwaves is not stronger than that for millimeter waves, the microwaves are radiated in a wide angular range such as a near-omnidirectional range.

When the multiband terminal 1101 receives a microwave frame, the control unit 1205 switches the microwave antenna unit 1203 to the reception mode. Microwaves are received over a wide angular range such as a near-omnidirectional range. The microwave antenna unit 1203 outputs the received microwave band radio signal to the microwave reception unit 1208. The microwave reception unit 1208 detects the microwave frame from the input microwave band radio signal, converts the microwave frame into a signal of a frequency band suitable for signal processing, demodulates the signal in accordance with a predetermined signal format, and outputs the received data to the control unit 1205. In addition, on the basis of the signal from the microwave reception unit 1208, the microwave reception quality measurement unit 1209 measures the reception quality of the microwave signal (for example, Receive Signal Strength Indicator (RSSI) indicating the reception strength, the signal-to-noise ratio SNR (Signal-to-Noise Ratio), the signal-to-interference noise ratio SINR (Signal-to-Interference-plus-Noise Ratio), and the error rate) and outputs the measurement result to the control unit 1205.

The control unit 1205 outputs information to be displayed on the display unit 1206 on the basis of the information regarding the input millimeter wave signal and millimeter wave reception quality and the information regarding the microwave signal and the microwave reception quality. The display unit 1206 displays the input information to the user by using a device such as a display panel or an indicator.

Figure 13:
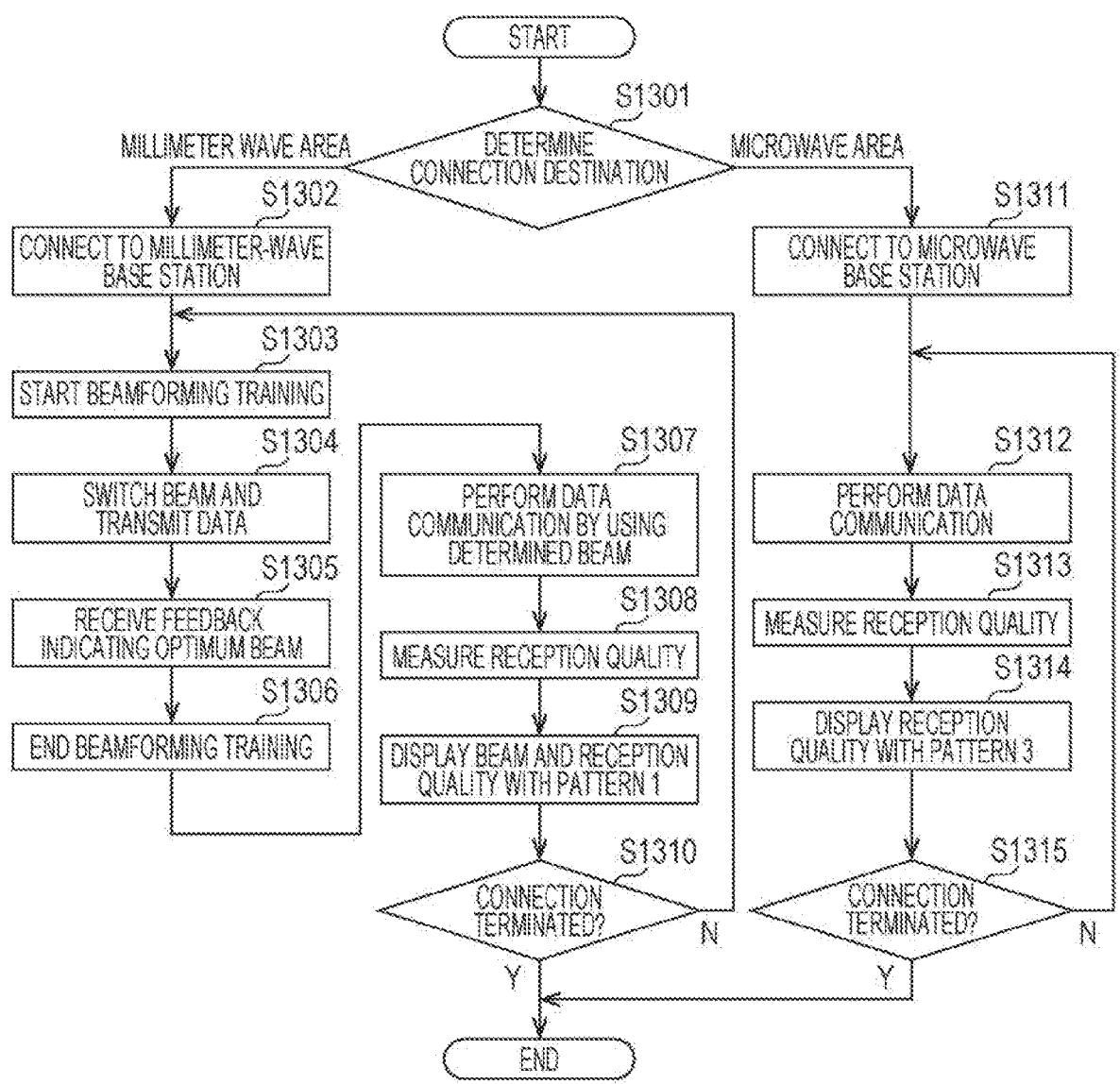
FIG. 13 is a flowchart illustrating the control performed by a control unit before a display operation is performed according to the third embodiment.

FIG. 13 is a flowchart illustrating the control performed by the control unit 1205 of the multiband terminal 1101 before the control unit 1205 displays the information according to the present embodiment. In FIG. 13, "S" represents "step".

In step S1301, the control unit 1205 determines the connection destination. If the control unit 1205 determines that the multiband terminal 1101 has moved into the communication coverage area 1108, the processing proceeds to step S1311, where the multiband terminal 1101 connects to the microwave base station apparatus 1107. If the control unit 1205 determines that the multiband terminal 1101 has moved into the communication coverage area 1103, the processing proceeds to step S1302, where the multiband terminal 1101 connects to the millimeter-wave base station apparatus 1102. To determine into which one of the communication coverage areas the multiband terminal 1101 has moved, map information and position information, for example, may be used. Alternatively, the determination may be made by receiving a beacon or the like transmitted from the base station apparatus. Still alternatively, the user may selectively change the connection destination.

In step S1302, the multiband terminal 1101 starts establishing connection with the millimeter-wave base station apparatus 1102. For example, the control unit 1205 detects that the multiband terminal 1101 has moved into the communication coverage area 1103 by detecting a beacon frame periodically transmitted by the millimeter-wave base station apparatus 1102. Thereafter, the control unit 1205 sends a connection request to the millimeter-wave base station apparatus 1102.

After the connection with the millimeter-wave base station apparatus 1102 is established, beamforming training is started (step S1303). As described above, each time the beam is switched, a training frame is transmitted (step S1304). Thereafter, a feedback frame transmitted from the millimeter-wave base station apparatus 1102 is received (step S1305), and a beam to be used for communication with the millimeter-wave base station apparatus 1102 is determined. Thus, the beamforming training is completed (step S1306).

After the beamforming training is completed, a data communication period starts. The multiband terminal 1101 performs data communication with the millimeter-wave base station apparatus 1102 by using the determined beam (step S1307).

At this time, the multiband terminal 1101 measures the millimeter wave reception quality by using a reception frame during data communication (step S1308) and displays the measured millimeter wave reception quality and the determined beam on the display unit 1206 by using pattern A described below (FIG. 14A) (step S1309). In step S1310, the multiband terminal 1101 determines whether to terminate the connection. If the connection is not to be terminated, the processing performed by the multiband terminal 1101 returns to step S1303. However, if the connection is to be terminated, the multiband terminal 1101 ends the processing.

In addition, in step S1311, the multiband terminal 1101 starts connection with the microwave base station apparatus 1107. For example, the control unit 1205 detects that the multiband terminal 1101 has moved into the communication coverage area 1108 by detecting a microwave beacon frame periodically transmitted by the microwave base station apparatus 1107. Thereafter, the control unit 1205 sends a connection request to the microwave base station apparatus 1107.

After the connection with the microwave base station apparatus 1107 is completed, the data communication period starts. The multiband terminal 1101 performs data communication with the microwave base station apparatus 1107 (step S1312).

At this time, the multiband terminal 1101 measures the microwave reception quality by using a microwave reception frame during data communication (step S1313) and displays the measured microwave reception quality on the display unit 1206 by using pattern B described below (FIG. 14B) (step S1314). In step S1315, the multiband terminal 1101 determines whether to terminate the connection. If the connection is not to be terminated, the processing performed by the multiband terminal 1101 returns to step S1312. However, if the connection is to be terminated, the multiband terminal 1101 ends the processing.

Figure 14A:
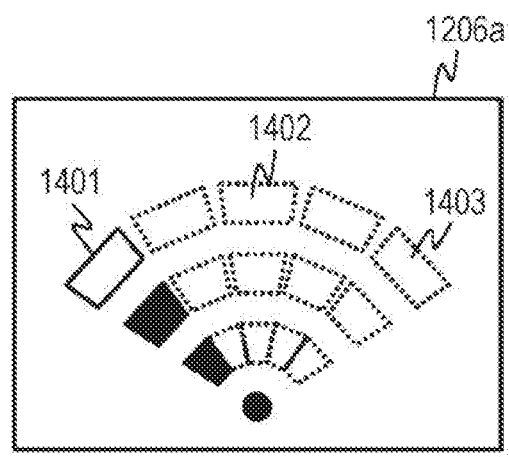
FIG. 14A illustrates a display image displayed when communication using a millimeter wave band is performed according to the third embodiment.
Figure 14B:
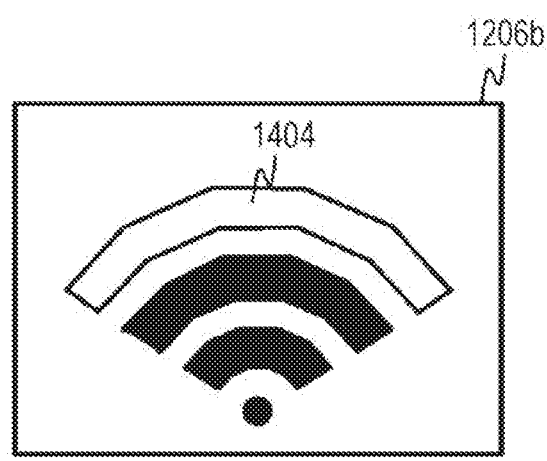
FIG. 14B illustrates a display image displayed when communication using a microwave band is performed according to the third embodiment.

FIG. 14A and FIG. 14B illustrate display examples of display patterns displayed on the display unit 1206. According to the present embodiment, when communication using the millimeter wave band is performed, the display pattern indicates the direction of the formed beam (FIG. 14A). In contrast, when communication using the microwave band is performed, the display pattern indicates a radiation pattern wider than that of the millimeter wave beam (FIG. 14B). In practice, in the examples illustrated in FIGS. 14A and 14B, when communication using the millimeter wave band is performed, the display pattern indicates the direction of the beam and the reception quality level. In contrast, when communication using the microwave band is performed, the display pattern indicates the reception quality level by using a wide radiation pattern because of the omnidirectional property.

The display examples are described in more detail below. When the multiband terminal 1101 is connected to the millimeter-wave base station apparatus 1102, the multiband terminal 1101 performs the same display operation (pattern A) as in the first embodiment illustrated in FIG. 14A. However, when the multiband terminal 1101 is connected to the microwave base station apparatus 1107, the multiband terminal 1101 performs a display operation illustrated in FIG. 14B (pattern B).

A display pattern 1404 illustrated in FIG. 14B is represented by a color-filled block having an angular range wider than that of the display pattern illustrated in FIG. 14A in order to express the omnidirectional property of the microwaves. Thus, the user can easily tell whether the multiband terminal 1101 is connected by using millimeter waves or microwaves on the basis of a change in the angle range. To display the microwave reception quality, the number of color-filled blocks can be used, like a display pattern 1401 for millimeter waves (FIG. 14A).

As described above, according to the present embodiment, since the selected frequency band, the direction of the beam, and the reception quality are displayed so that the user can understand the information, the user can easily tell which one of the microwave band and the millimeter wave band is used by the multiband terminal 1101 to connect to the base station apparatus. Therefore, when the multiband terminal 1101 is connected by using millimeter waves, the user can determine the direction in which the terminal should be pointed to improve the communication quality. As a result, stable communication can be easily performed even when there is a shielding object or the like. In addition, when the multiband terminal 1101 is connected by using microwaves, the user can understand that the communication quality negligibly changes even when the user changes one of the posture and the direction of the multiband terminal 1101.

While a variety of embodiments have been described with reference to the accompanying drawings, it should be appreciated that the present disclosure is not limited to such examples. Those skilled in the art will appreciate that various modifications or variations may be made without departing from the scope or sprit of the claims attached, and the modifications or variations should be encompassed within the technical scope of the present disclosure. In addition, the constituent elements of the above-described embodiments may be combined in any way within the scope and sprit of the present disclosure.

In the display examples of FIGS. 5, 10A, 10B, 14A, and 14B, the beam direction and the reception quality are expressed by filling the corresponding blocks (areas) with a color. However, it is only required to display the areas corresponding to the beam direction and the reception quality by using a distinguishable color or pattern. Note that the beam direction and the reception quality may be expressed by using a shape other than a circular sector.

While the above embodiments have been described with reference to a hardware configuration, the configuration according to the present disclosure can be achieved by using software in cooperation with hardware.

Note that each of the functional blocks used in the description of the above embodiments is typically provided in the form of an LSI which is an integrated circuit having an input terminal and an output terminal. The integrated circuit may control the functional block used in the description of the above embodiments and may have an input and an output. The functional blocks may be formed as individual chips, or some or all of the functional blocks may be integrated into a single chip. The term "LSI" is used herein, but the term "IC", "system LSI", "super LSI" or "ultra LSI" may be used as well depending on the level of integration.

In addition, the circuit integration is not limited to LSI and may be achieved by dedicated circuitry or a general-purpose processor other than an LSI. A field programmable gate array (FPGA), which is programmable after fabrication of the LSI, or a reconfigurable processor which allows reconfiguration of connections and settings of circuit cells in LSI may be used.

Moreover, should a circuit integration technology replacing LSI appear as a result of advancements in semiconductor technology or other technologies derived from the technology, the functional blocks could be integrated using such a technology. Another possibility is the application of biotechnology, for example.

A wireless communication apparatus according to the present disclosure includes a first antenna circuit that forms a beam selected from among a plurality of first beams through a beamforming process performed for communication using a millimeter wave band and a monitor that displays a first pattern indicating a radiation direction of the selected beam.

In the wireless communication apparatus according to the present disclosure, the monitor displays a second pattern indicating a radiation direction of a beam not selected by the first antenna circuit among the plurality of first beams with a pattern that differs from the first pattern.

In the wireless communication apparatus according to the present disclosure, the display unit displays the first pattern and the second pattern with a plurality of circular sectors, and the display unit displays the first pattern as one area of the plurality of circular sectors with different color or different pattern from the other area.

In the wireless communication apparatus according to the present disclosure, the first pattern represents the reception quality of the selected beam.

In the wireless communication apparatus according to the present disclosure, each of the plurality of circular sectors includes divided areas obtained by dividing the circular sector into a plurality of areas in a radial direction. In a case where the reception quality of the selected beam has the lowest level, the monitor displays one of the divided areas corresponding to a center angle portion colored or patterned. In a case where the reception quality of the selected beam has the highest level, the monitor displays all of the divided areas colored or patterned.

The wireless communication apparatus according to the present disclosure includes a second antenna circuit that forms a beam selected from among a plurality of second beams having radiation directions that differ from the radiation directions of the first antenna circuit through the beamforming process. The monitor displays a third pattern indicating a radiation direction of a beam selected by the second antenna circuit and a fourth pattern indicating a radiation direction of a beam not selected by the second antenna circuit among the second beams.

The wireless communication apparatus according to the present disclosure includes a third antenna circuit that performs communication using a microwave band. During communication using the first antenna circuit, the monitor displays the first pattern. During communication using the third antenna circuit, the monitor displays a fifth pattern indicating a reception quality in the microwave band.

According to the present disclosure, a display method for used in a wireless communication apparatus includes forming a beam selected from among a plurality of first beams through a beamforming process performed for communication using a millimeter wave band and displaying a first pattern indicating a radiation direction of the selected beam.

The present disclosure is suitable for use in a mobile communication system.

What is claimed is:

1. A wireless communication apparatus comprising:
a first antenna circuit that forms a selected first radio wave selected from among a plurality of first radio waves through a beamforming process performed for communication using a millimeter wave band; and
a monitor that displays a first pattern indicating a radiation direction and a reception quality of the selected first radio wave, and a second pattern indicating a radiation direction of one of the first radio waves other than the selected first radio wave,
wherein the first pattern is different from the second pattern,
wherein the monitor displays the first pattern and the second pattern using a circle sector that is divided at a center angle portion of the circle sector by a predetermined angle into a plurality of circular sectors and each of the circular sectors is divided in a radial direction into a plurality of divided areas,
wherein in a case where the reception quality of the selected first radio wave has a lowest level, the monitor displays a first divided area of a first circular sector of the circular sectors colored or patterned, the first divided area being adjacent to the center angle portion of the circle sector,
wherein in a case where the reception quality of the selected first radio wave has a highest level, the monitor displays all of the divided areas of the first circular sector colored or patterned, and
wherein, in a case where the reception quality of the selected first radio wave has an intermediate level that is greater than the lowest level and less than the highest level, the monitor displays at least two of the divided areas including the first divided area and a second divided area of the first circular sector adjacent to the first divided area colored or patterned.

2. The wireless communication apparatus according to claim 1, wherein the monitor displays the center angle portion of the circle sector with a color or a pattern and does not display the first pattern and the second pattern while the first antenna circuit performs the beamforming process.

3. The wireless communication apparatus according to claim 1, comprising:
a second antenna circuit that forms a selected second radio wave selected from among a plurality of second radio waves having radiation directions that differ from the radiation directions of the first antenna circuit through the beamforming process, wherein the monitor displays a third pattern indicating a radiation direction of the second selected radio wave and a fourth pattern indicating a radiation direction of one of the second radio waves other than the second selected radio wave.

4. The wireless communication apparatus according to claim 1, comprising:

a third antenna circuit that performs communication using a microwave band, wherein during communication using the first antenna circuit, the monitor displays the first pattern, and wherein during communication using the third antenna circuit, the monitor displays a fifth pattern indicating a reception quality in the microwave band.

5. A display method for use in a wireless communication apparatus comprising:

forming a first selected radio wave selected from among a plurality of first radio waves through a beamforming process performed for communication using a millimeter wave band; and displaying a first pattern indicating a radiation direction and a reception quality of the first selected radio wave, and a second pattern indicating a radiation direction of one of the first radio waves other than the selected first radio wave, wherein the first pattern is different from the second pattern, wherein the displaying includes displaying the first pattern and the second pattern using a circle sector that is divided at a center angle portion of the circle sector by a predetermined angle into a plurality of circular sectors and each of the circular sectors is divided in a radial direction into a plurality of divided areas, wherein in a case where the reception quality of the selected first radio wave has a lowest level, the displaying includes displaying a first divided area of a first circular sector of the circular sectors colored or patterned, the first divided area being adjacent to the center angle portion of the circle sector, wherein in a case where the reception quality of the selected first radio wave has a highest level, the displaying includes displaying all of the divided areas of the first circular sector colored or patterned, and wherein, in a case where the reception quality of the selected first radio wave has an intermediate level that is greater than the lowest level and less than the highest level, the displaying includes displaying at least two of the divided areas including the first divided area and a second divided area of the first circular sector adjacent to the first divided area colored or patterned.

6. The display method according to claim 5, further comprising: displaying the center angle portion of the circle sector with a color or a pattern and not displaying the first pattern and the second pattern while the beamforming process is performed.

* * * * *